US008061660B2

(12) United States Patent
Beidleman et al.

(10) Patent No.: US 8,061,660 B2
(45) Date of Patent: *Nov. 22, 2011

(54) LARGE-SCALE DEPLOYABLE SOLAR ARRAY

(75) Inventors: Neal Beidleman, Aspen, CO (US); Gregg Freebury, Lafayette, CO (US); Will Francis, Boulder, CO (US); Mark Lake, Erie, CO (US); Rory Barrett, Erie, CO (US); Philip N. Keller, Longmont, CO (US); Robert Taylor, Superior, CO (US)

(73) Assignee: Composite Technology Development, Inc., Lafayette, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/873,615

(22) Filed: Sep. 1, 2010

(65) Prior Publication Data
US 2011/0192444 A1 Aug. 11, 2011

Related U.S. Application Data

(63) Continuation of application No. 11/695,163, filed on Apr. 2, 2007, now Pat. No. 7,806,370.

(60) Provisional application No. 60/788,449, filed on Mar. 31, 2006.

(51) Int. Cl.
*B64G 1/22* (2006.01)
(52) U.S. Cl. ............... 244/172.7; 244/173.3; 244/159.4; 244/159.5; 244/159.6; 244/172.6; 136/245; 136/292
(58) Field of Classification Search ............... 244/159.4, 244/159.5, 159.6, 172.6, 120, 119, 122 A, 244/158.1, 172.7, 173.3; 136/245, 292
See application file for complete search history.

(56) References Cited

U.S. PATENT DOCUMENTS

| 3,165,751 A | 1/1965 | Clark |
| 3,473,758 A | 10/1969 | Webb |
| 3,477,662 A | 11/1969 | Anderson |
| 3,735,942 A | 5/1973 | Palz |
| 3,735,943 A | 5/1973 | Fayet |
| 3,817,481 A | 6/1974 | Berks et al. |
| 3,863,870 A | 2/1975 | Andrews et al. |
| 4,133,501 A | 1/1979 | Pentlicki |
| 4,475,323 A | 10/1984 | Schwartzberg et al. |

(Continued)

OTHER PUBLICATIONS

Spence, Brian R et al., "Mars Pathfinder Rover Egress Deployable Ramp Assembly", $30^{th}$ Aerospace Mechanisms Symposium, NASA Langley Research Center, May 15-17, 1996, 16 pages.

(Continued)

*Primary Examiner* — Tien Dinh
*Assistant Examiner* — Justin Benedik
(74) *Attorney, Agent, or Firm* — Kilpatrick Townsend & Stockton LLP

(57) ABSTRACT

A deployable structure is disclosed. The deployable structure may include one or more slit-tube longerons; and one or more flat sheets coupled with the one or more slit-tube longerons. The one or more slit-tube longerons and the one or more flat sheets may be stowed by rolling the one or more slit-tube longerons and the one or more flat sheets together into a roll. In one embodiment, at least a portion of the one or more slit-tube longerons may be exposed when stowed. In another embodiment, the one or more slit-tube longerons may be manufactured from a shape memory material. These slit-tube longerons unroll into to a straight configuration when exposed to heat.

19 Claims, 10 Drawing Sheets

U.S. PATENT DOCUMENTS

| | | |
|---|---|---|
| 4,636,579 A | 1/1987 | Hanak et al. |
| 4,713,492 A | 12/1987 | Hanak |
| 4,727,932 A | 3/1988 | Mahefkey |
| 4,747,567 A | 5/1988 | Johnson et al. |
| 4,787,580 A | 11/1988 | Ganssle |
| 5,296,044 A | 3/1994 | Harvey et al. |
| 5,487,791 A | 1/1996 | Everman et al. |
| 5,520,747 A | 5/1996 | Marks |
| 5,720,452 A | 2/1998 | Mutschler, Jr. |
| 5,785,280 A | 7/1998 | Baghdasarian |
| 5,833,176 A | 11/1998 | Rubin et al. |
| 5,857,648 A | 1/1999 | Dailey et al. |
| 5,927,654 A | 7/1999 | Foley et al. |
| 6,017,002 A | 1/2000 | Burke et al. |
| 6,137,454 A | 10/2000 | Peck |
| 6,228,441 B1 | 5/2001 | Suzuki et al. |
| 6,343,442 B1 | 2/2002 | Marks |
| 6,437,232 B1 | 8/2002 | Dailey et al. |
| 6,478,261 B2 | 11/2002 | Laraway et al. |
| 6,547,190 B1 | 4/2003 | Thompson et al. |
| 6,568,638 B1 | 5/2003 | Capots |
| 6,581,883 B2 | 6/2003 | McGee et al. |
| 6,637,702 B1 | 10/2003 | McCandless |
| 6,702,976 B2 | 3/2004 | Sokolowski |
| 6,772,479 B2 | 8/2004 | Hinkley et al. |
| 6,775,046 B2 | 8/2004 | Hill et al. |
| 6,872,433 B2 | 3/2005 | Seward et al. |
| 6,983,914 B2 | 1/2006 | Stribling et al. |
| 2002/0096603 A1 | 7/2002 | Bauer et al. |
| 2005/0178921 A1 | 8/2005 | Stribling et al. |
| 2007/0262204 A1 | 11/2007 | Beidleman et al. |

OTHER PUBLICATIONS

Notification of Transmittal of the International Search Report and Written Opinion of the International Searching Authority, or the Declaration for PCT/US11/26437 mailed Jun. 27, 2011.

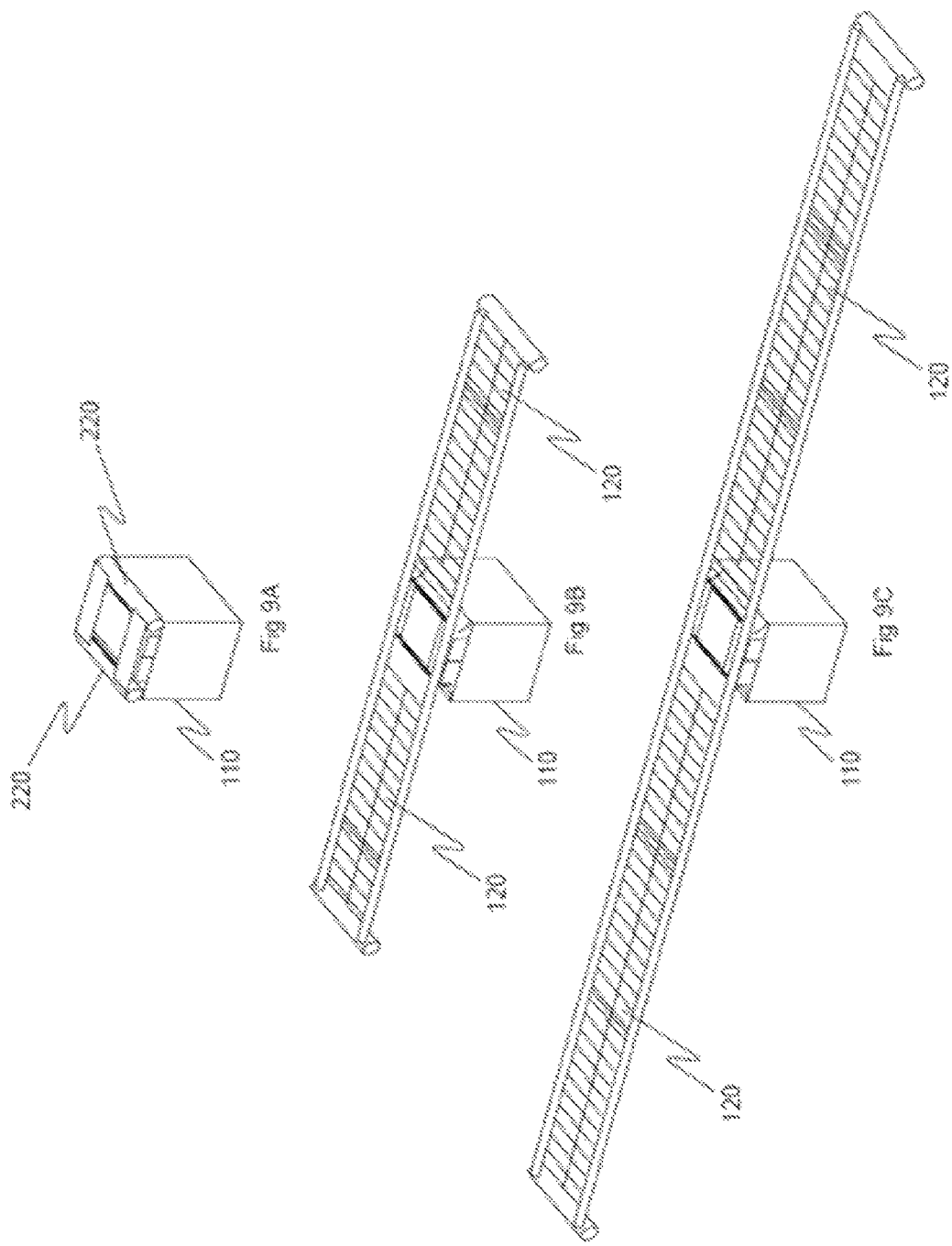

LARGE-SCALE DEPLOYABLE SOLAR ARRAY

CROSS-REFERENCES TO RELATED APPLICATIONS

This application is a continuation, and claims the benefit, of co-pending, commonly assigned U.S. patent application Ser. No. 11/695,163, filed Apr. 2, 2007, entitled "Large-Scale Deployable Solar Array," which is a non-provisional of, and claims the benefit of the filing date of, co-pending, commonly assigned, U.S. Provisional Application No. 60/788,449, filed on Mar. 31, 2006, entitled "Large-Scale Deployable Solar Array," the entirety of which is herein incorporated by reference for all purposes.

STATEMENT AS TO RIGHTS TO INVENTIONS MADE UNDER FEDERALLY SPONSORED RESEARCH AND DEVELOPMENT

The U.S. Government may have rights in this invention pursuant to Contract No. FA9453-04-M-0302.

BACKGROUND OF THE INVENTION

This invention relates to the field of rocket launched spacecraft and, in particular, to deployable spacecraft structures such as solar arrays and booms.

Most deployable solar arrays for spacecraft have used crystalline solar cells mounted to rigid panels. Certain prior art describes mechanisms to effectively package, carefully deploy, and maintain the shape of arrays of rigid panels. Flexible solar arrays have also been used, but have been limited to thin-film arrays packaged in a long roll or pleated stack that is deployed using a separate boom or booms.

Thin photovoltaic arrays have been used for the original solar arrays on the Hubble Space Telescope and for the primary solar arrays on the International Space Station (ISS). The Hubble arrays were packaged in a roll and deployed with booms mounted on either side of the roll that pull the roll out into a sheet as they extend. The ISS arrays were packaged into a stack by folding and pleating a long, thin sheet of material that is deployed with a single boom mounted underneath the array that pulls the stack into a sheet as it extends.

SUMMARY OF THE INVENTION

One embodiment of the invention provides for a deployable structure. The deployable structure may include one or more slit-tube longerons coupled with one or more flat sheets. The one or more slit-tube longerons and the one or more flat sheets may be stowed as a roll. At least a portion of the slit-tube longerons may be exposed when stowed. The structure may also include a gimbal mount. The one or more longerons may also be constructed of shape memory material. The structure may also be used on a spacecraft, such as a satellite. The one or more flat sheets may include a solar array. A heater may also be coupled to the structure that is adapted to heat the slit-tube longerons.

Another embodiment of the invention provides for a method of stowing a structure having one or more slit-tube longerons and one or more flat sheets. The method includes coupling the one or more slit-tube longerons with the one or more flat sheets, and rolling the one or more slit-tube longerons and the one or more flat sheets together into a roll from an end of the structure back to a base of the structure. The method may also include securing the roll with one or more clips.

Another embodiment of the invention provides for a method of deploying a structure having one or more slit-tube longerons made of shape memory material and one or more flat sheets rolled together in a roll. The method may include exposing the one or more longerons to heat and allowing the roll to unravel as the one or more longerons extend from exposure to the heat. The method may include exposing the one or more longerons to sunlight. The method may also include releasing one or more clamps that secure the roll in the rolled position.

BRIEF DESCRIPTION OF THE DRAWINGS

FIGS. 9A-C show a bi-directional deployment of solar array structures according to one embodiment of the invention.

DETAILED DESCRIPTION OF THE INVENTION

Figure 1:
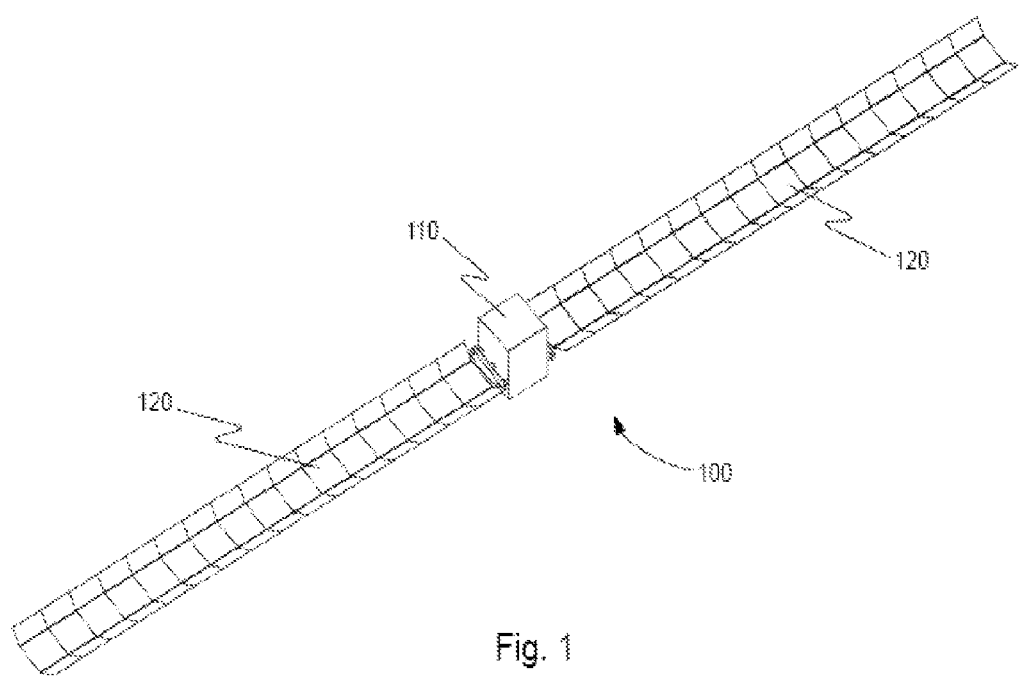
FIG. 1 shows a two solar array structures coupled with a spacecraft according to one embodiment of the invention.

Spacecraft are limited in power, stowed volume, and mass available to meet requirements. These parameters are traded against each other as well as overall cost in spacecraft design. More efficient solar array packaging and mass would allow spacecraft to have more power on orbit or the same power for less mass and stowed volume. Additional power could be used, for example, to increase services for RF communications, provide power for electric propulsion, or increase the science capability of exploratory spacecraft. Similarly, additional stowed volume could be used, for example, for additional antennas for RF communications or larger science instruments. Also, a simpler solar array design could be fabricated and tested for a lower cost. Because of the extremely constrained nature of spacecraft design and because nearly all spacecraft require solar arrays for power, solar arrays with greater mass and volume efficiency could be used to increase the capability or decrease the cost of a spacecraft for any mission.

For purposes of illustration only, embodiments of invention are described herein in regard to a solar array subsystem which is deployed from an on-orbit spacecraft in zero gravity.

Those skilled in the art will recognize that the embodiments of the invention may be applied to other applications.

One embodiment of the invention provides for one or more slit-tube longerons coupled with one or more flat sheets of solar array material. The slit-tube longerons may be back rolled with the flat sheets when stored and prior to deployment. The slit-tube longerons may also be made out a shape memory material that unrolls when exposed to heat, such as provided by sunlight. The longerons may be coupled with a gimbal structure that in turn may be coupled with a spacecraft.

Another embodiment of the invention provides for a method for stowing a structure having one or more slit-tube longerons and one or more flat sheets. The method may include coupling the one or more slit-tube longerons with the one or more flat sheets and rolling the one or more slit-tube longerons and the one or more flat sheets together into a roll from an end of the structure back to a base of the structure. The method may also include applying heat to the longerons prior to and during the rolling of the longerons. The method may further include securing the rolled longerons and flat sheets with a clamp. The method may also include attaching the one or more longerons to a gimbal structure that is attached to a spacecraft. This method may specifically be used to deploy a solar array comprising a blanket of solar cells.

Another embodiment of the invention provides for a method for deploying a rolled structure having one or more slit-tube longerons and one or more flat sheets. The method may include heating the one or more longerons, for example, by exposing the one or more longerons to the sun. Allowing the rolled structure to unroll in response to heat from the sun. The method may also include unclamping the roll. Further, the method may also include positioning the rolled structure in such a way to increase the solar radiation incident on the rolled structure.

Turning first to FIG. 1, a spacecraft 110 is shown with two deployed solar array structures 120 according to one embodiment of the invention. The solar array structures may be of any dimension. For example, each solar array structure 120 may be 5 feet across and 20 feet long (measured from the satellite to the end of the solar array). As another example, each solar array structure may be 20 feet wide and 50 feet long. As yet another example, each solar array structure may be 40 feet wide and 112 feet long. The size of the solar array may depend on the needs of the specific application, based in part, for example, on power needs, weight, and cost, but is not limited by the embodiments of the invention.

Figure 2:
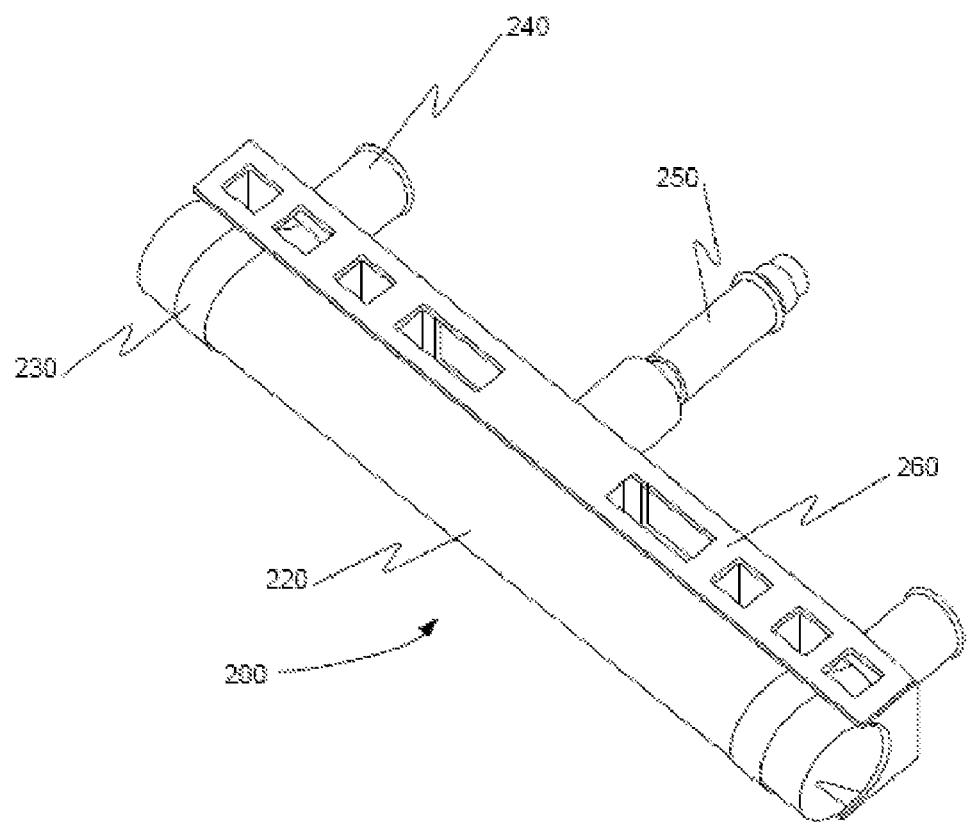
FIG. 2 shows a solar array structure in the rolled position couple and stowed with a yoke according to one embodiment of the invention.

FIG. 2 shows an undeployed, rolled solar array structure 220 attached to a yoke 260 according to one embodiment of the invention. The yoke 260 may be attached to a gimbal 250. The gimbal 250 may provide rotation of the solar array structure 120 in multiple dimensions. For example, the gimbal 250 may allow the structure, and hence the solar array structure 120 in this case, to be pointed toward the sun by the spacecraft 110 and its control system. Outboard from the gimbal 250 mount is a yoke 260. The yoke 260 may provide a load path between the solar array structure 120 and the gimbal 250 mount. It also provides a mechanism for supporting the rolled solar array, for example, during launch, deployment and while stowed in a rolled position.

Figure 3:
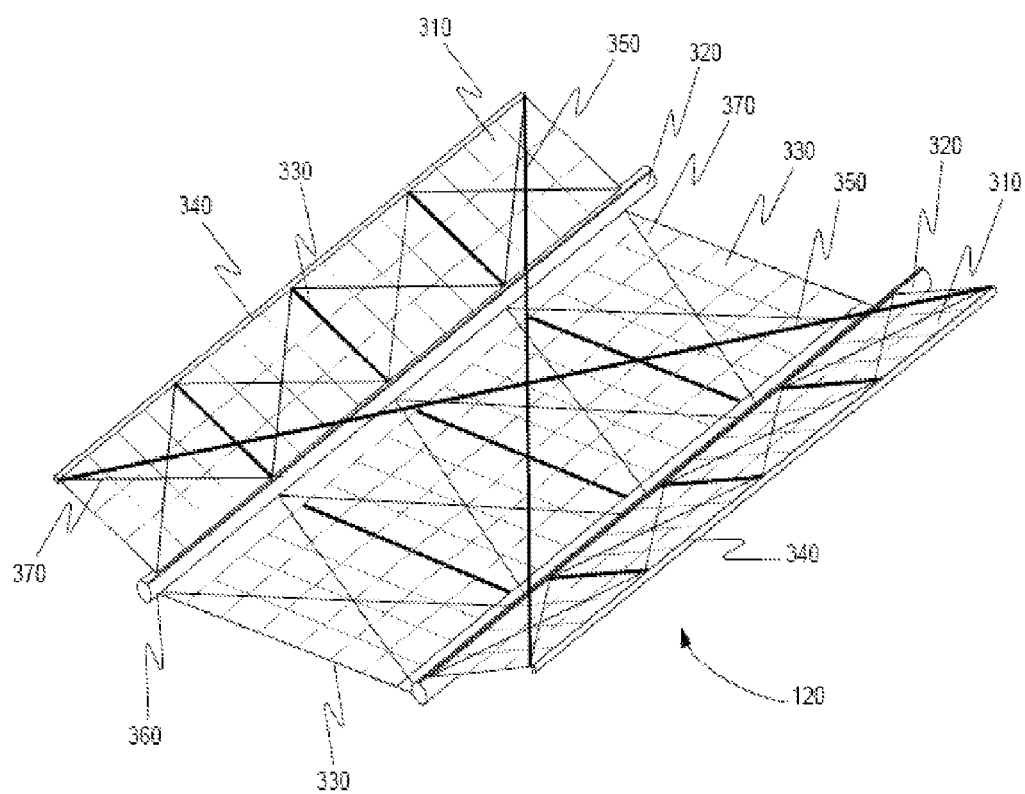
FIG. 3 shows a deployed solar array structure according to one embodiment of the invention.

FIG. 3 shows a solar array structure 120 in more detail according to one embodiment of the invention. This solar array has a central solar panel 300 and two wing solar panels 310. In this embodiment, the wing solar panels 310 are deployed to an angle not coplanar with the central solar panel 300. The wing solar panels 310 may alternatively be deployed coplanar with the central solar panel 300. Other embodiments of the invention may include a single central solar panel 300 without wing solar panels 310. Moreover, another embodiment may include a single central solar panel 300 and a single wing solar panel 310.

The solar array structure 120 may include two primary longerons 320, lateral battens 330, and wing edge longerons 340. The primary longerons 320 and the lateral battens 330 form structural panels. Other longerons and battens may be included for structural stability. Moreover, battens and longerons are not required. The central solar panel 300 and the wing solar panels 310 may be photovoltaic blankets. These photovoltaic blankets may include photovoltaic cells, such as, for example, silicon photovoltaic cells. The photovoltaic blankets may be, for example, thin film photovoltaics on a structural substrate or rigid cell photovoltaics on a mesh fabric. The photovoltaic cells may be grouped into panels. The photovoltaic cells may also be thin film photovoltaic cells. For example, the photovoltaic cells may include an amorphous silicon alloy or copper indium gallium deselinide cells deposited on a thin metallic or polyimide substrate.

Photovoltaics may be mounted on blanket assemblies and attached to a frame at junction points 360 along one of the primary longerons 320. Cable-style diagonals 370 may be included to stiffen both the central and wing solar panels. Wing diagonals 350 connecting and supporting the two wing solar arrays may also be included. The diagonals provide shear and torsional rigidity when the structure is fully deployed.

Figure 4:
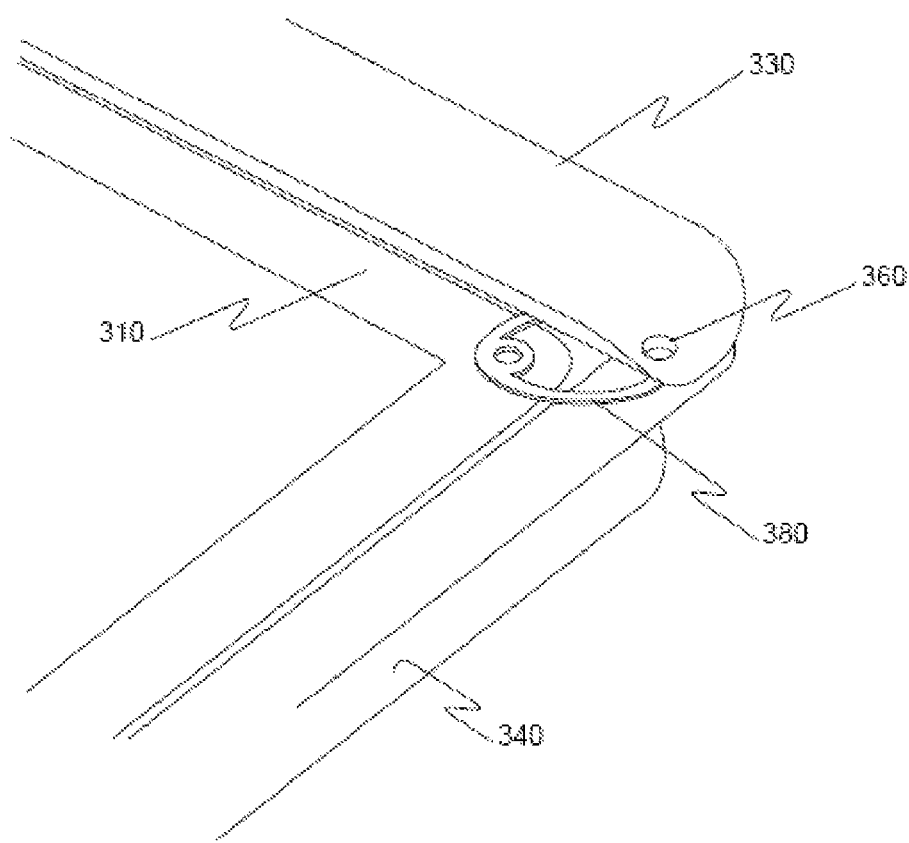
FIG. 4 shows a clip used to attach a solar blanket to a support structure according to one embodiment of the invention.

According to another embodiment of the invention, photovoltaic blankets may be attached to the frame junctions with clips 380 as shown in FIG. 4. The clips 380 may be attached at the junction point 360 of an wing edge longeron 340 and a batten 330. The clips 380 may allow for easy installation and removal of the photovoltaic blankets. They may include a spring to provide the preload necessary to tension the blanket inside of the frame sections. The soft spring also decreases the change in blanket tension due to manufacturing tolerances and any on-orbit distortions. The clips 380 with springs may also be set to decrease or eliminate tension being applied to the photovoltaic blanket. The photovoltaic blankets may be attached to the frame using other devices, such as for example, grommets, elastic cords, etc.

Figure 5:
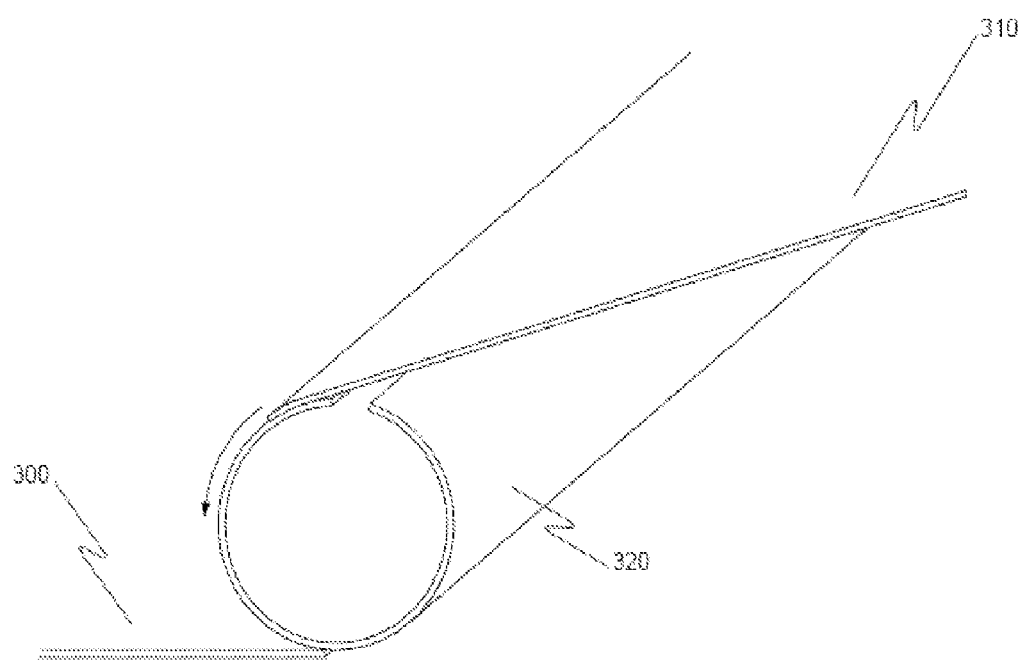
FIG. 5 shows a close up of a slit-tube longeron coupled with a central and wing solar panel according to one embodiment of the invention.

FIG. 5 shows a close up of a slit-tube primary longeron 320 coupled with a wing solar panel 310 and a central solar panel 300. The longerons are constructed such that they may be flattened and rolled for stowage while regaining their original cross-section during deployment. The primary longeron 320 may be a long tube with one or more slits 25. The slits may allow the tube to be flattened and rolled. The primary longeron 320 may be constructed from any elastic material or memory material, such as, for example, a metal, a composite, or a polymer. Many shape memory materials are known in the art. For example, the primary longerons 320 may comprise copper-zinc-aluminum, copper-aluminum-nickel, or nickel-titanium alloys. In another embodiment of the invention, the primary longerons 320 may be constructed from an elastic memory composite (EMC) material, such as, for example, TEMBO®, which is commercially available from Composite Technology Development, Inc. For added flexural properties the primary longerons 320 may have some curvature much like a carpenter's tape or may be stiffened by another mechanism such as a sandwich panel cross section with collapsed thickness for stowage.

Figure 6:
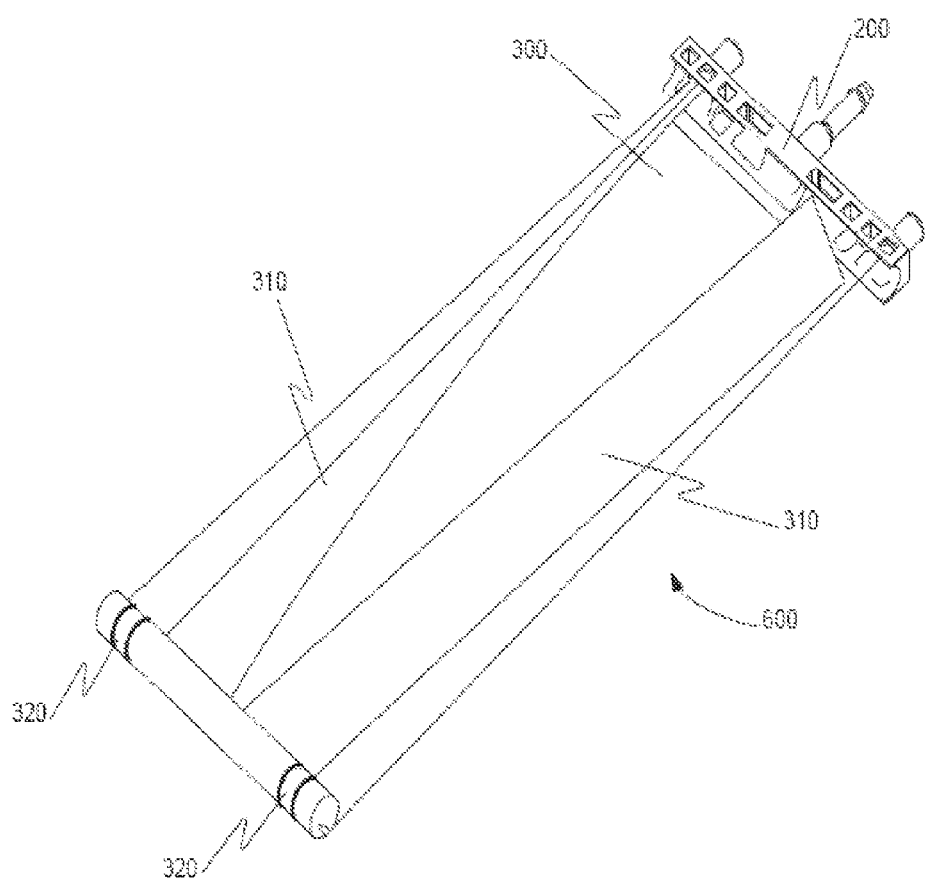
FIG. 6 shows a solar array structure being rolled according to one embodiment of the invention.

The primary longeron 320 may also act as wing hinge for the wing panels 310. The wing solar panels 310 may be folded onto the central solar panel 300 while the primary longeron 320 is flattened. This puts the three three-panel assembly (the two wing solar panels 310 and the central solar panel 300) into a single plane configuration which may then be rolled into a cylinder back to the yoke 260, as shown in FIG. 6. The rolled up array 220 may then be secured to the yoke 260 with a clamp band device 230 as shown in FIG. 2. Other mechanisms may be used to secure the rolled up array 220.

Figure 7A:
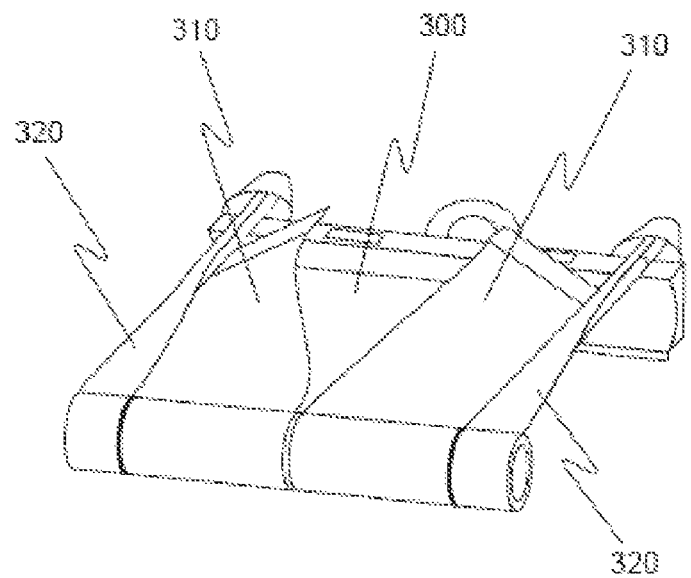
FIGS. 7A and 7B show a back-rolled and front-rolled solar array structure according other embodiments of the invention.
Figure 7B:
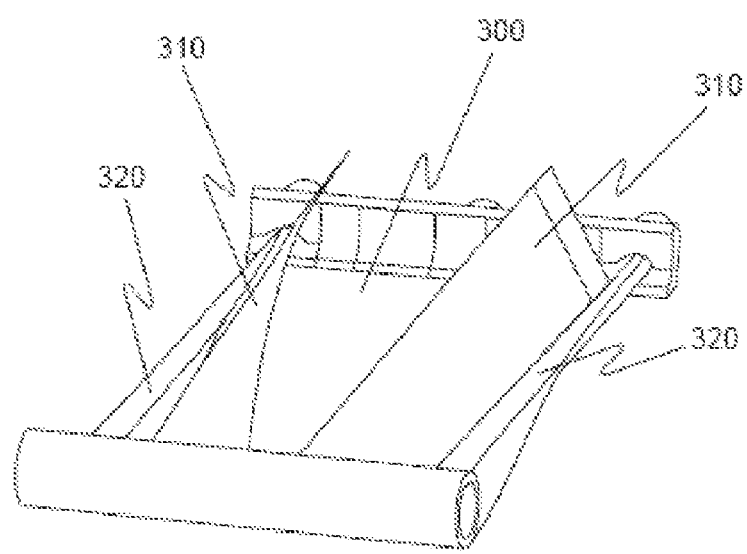

The solar arrays 300, 310 may be back-rolled as shown in FIG. 7A or front rolled as shown in FIG. 7B according to other embodiments of the invention. Back rolling occurs when the roll is above the plane of the deployed array. Front rolling occurs when the roll is below the plane of the deployed array. Moreover, the primary longerons 320 are exposed on the outside of the roll when back rolled and within the roll when front rolled. Reversing the roll direction may also change the attachment configuration of the wings to the rolled longeron.

The solar array structure 102 may be deployed by releasing the clamp band 230. The clamp band 230 provides initial kick-off force and pulls the rolled array away from the yoke 260. Additionally the clamp band 230 may provide supplementary root stiffness to the primary longeron. The deploying force is primarily derived from the strain energy stored in the rolled primary longeron; however, additional strain energy may also stored in the other frame elements, which are flattened and rolled into the stowed configuration. While the primary longeron is unrolling, the wings may deploy due to their integral nature with the primary longerons. The wings are deployed as the flattened primary longeron is restored to its preformed shape. The deploying wing solar panels 310 may provide stability during deployment. The wing solar panels 310 may also decrease the ability for the rolled array to unfurl and then roll back on itself like a yo-yo. The wing solar panels 310 may also provide some depth to the structure, which in turn may control the deployment profile. This coordinated deployment also dissipates the stored energy into multiple kinetic energy paths (left wing, right wing, unfurling tip mass). This decreases the amount of force and moment that must be reacted and controlled by the host spacecraft when the structure reaches its final deployed position. When deployment is complete, the wing to wing diagonal members will be slightly tensioned through residual strain energy in the primary longerons.

Figure 8:
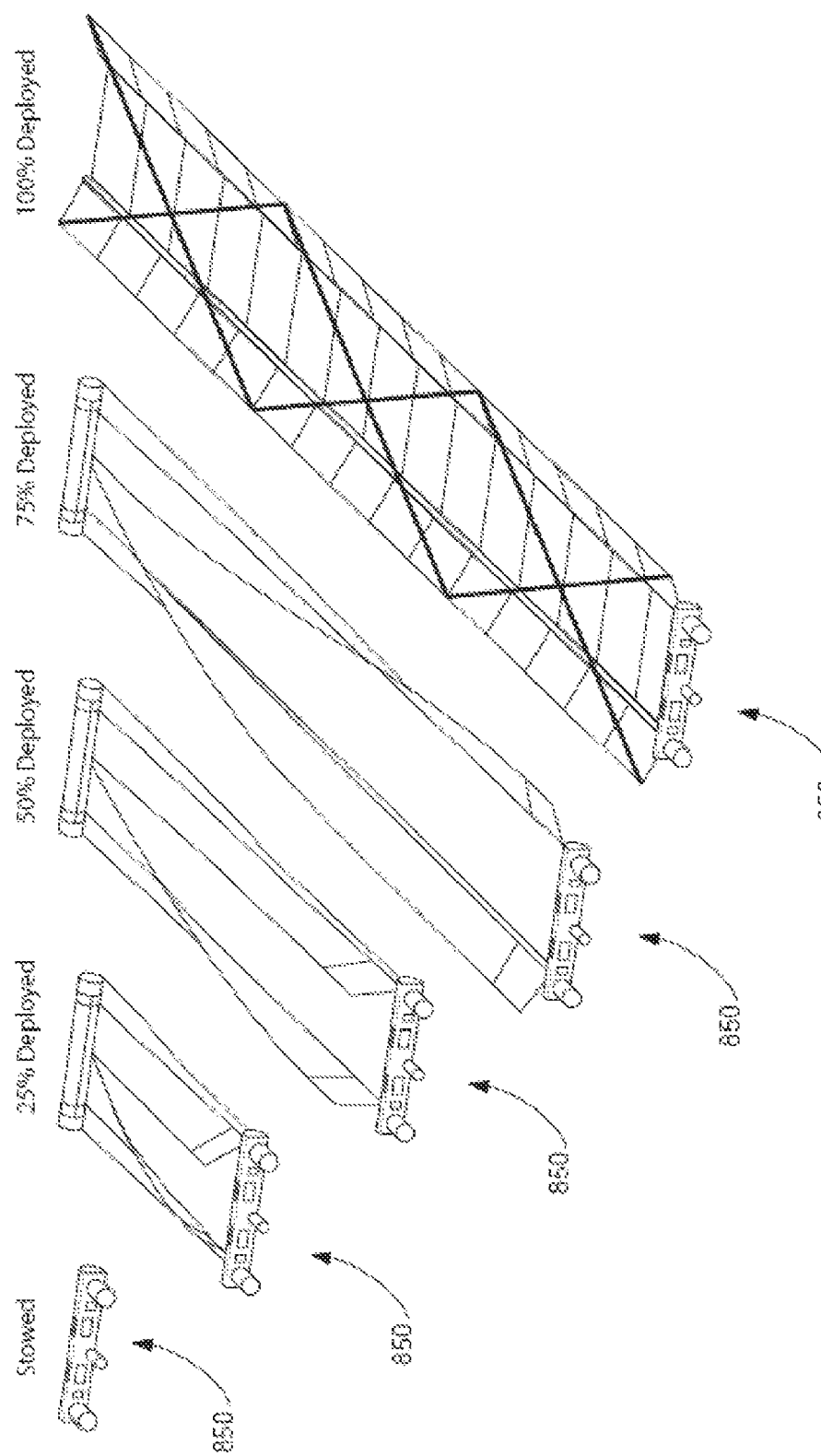
FIG. 8 shows the progression of a solar array structure from being stowed to fully deployed according to one embodiment of the invention.

FIG. 8 shows a progression as the structure is deployed according to one embodiment of the invention. The rolled array is stowed with the yoke 810. The figure then shows the solar array structure deployed over various phases from stowed 810 to 25% deployed to 50% deployed to 75% deployed to 100% deployed. The figure also shows how the wings are deployed during each stage of deployment.

Barreling and rate of deployment are controlled through the primary longeron 320. The longeron may include a bi-stable elastic design and/or include a shape memory material. The shape memory material may have integral heaters that are electronically controlled. The longerons may also be heated by solar energy. In such a case, the array may be back rolled so that the primary longerons 320 may be exposed to the sun when the array is rolled. Solar energy may then provide automatic deployment control because only the outside of the rolled longeron would be heated. The rate of unrolling would be limited because of the time required to heat the material to deployment temperature as it reaches the outside of the roll. Additional control could be added by using a spooled cable (not shown) attached to the tip of the primary longeron. The rate of cable release is controlled by a drag or braking mechanism mounted on the yoke 260.

In order for EMC material to regain its previous structure, both packaging and deployment may need to be accomplished above the materials glass transition temperature. In one embodiment, surface-bonded heaters may be used for packaging and deployment control of the slit-tube longerons. In another embodiment, solar energy may be used to deploy the solar array structures 120. Accordingly, the stowed and rolled structure may be turned toward the sun in such a way that the primary longerons 320 are heated. The heat causes the longerons to deploy by regaining a previously established shape.

FIGS. 9A-9C show a spacecraft 110 with bi-directional deployed solar array structures according to another embodiment of the invention. A space craft may have two rolled and stowed solar array structures 120 as shown in FIG. 9A. The two rolled and stowed solar array structures may begin deployment, as shown in FIG. 9B. FIG. 9C shows the two solar array structures 120 fully deployed in opposite directions. The solar array structures do not include wing solar panels.

Figure 10A:
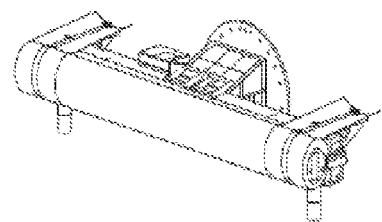
FIGS. 10A and 10B show another embodiment of a stowed and deployed solar array structure.
Figure 10B:
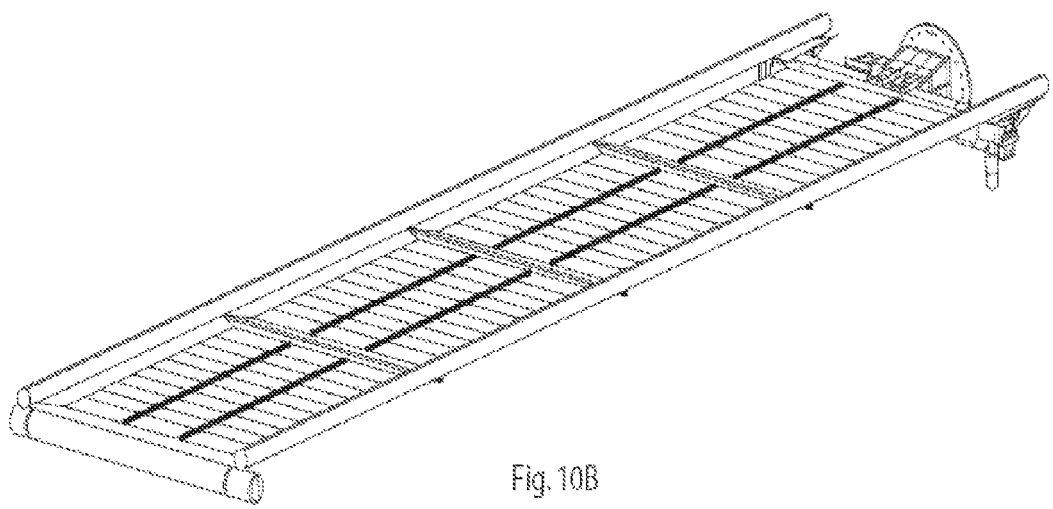

FIGS. 10A and 10B show a stowed and deployed solar array structure according to another embodiment of the invention. The embodiment shown in this figure shows a solar array structure coupled with a different yoke. The yoke may be adapted to rotate and/or position the solar array structure in a number of different positions. This solar array structure also includes only a central solar panel couple with two slit-tube longerons.

Having fully described several embodiments of the present invention, many other equivalent or alternative methods of producing the cladding layers of the present invention will be apparent to those of skill in the art. These alternatives and equivalents are intended to be included within the scope of the invention, as defined by the following claims.

What is claimed is:

1. A deployable array comprising:
    a longeron comprising a tubular member with a slit along the longitudinal length of the longeron;
    an array coupled with the longeron; and
    a plurality of photovoltaic cells coupled with the array;
    wherein the longeron and the array are stowed as a roll, wherein the roll is configured to deploy by being unrolled from the rolled configuration along a longitudinal length of the longeron.

2. The deployable solar array of claim 1, wherein the array comprises a mesh fabric.

3. The deployable solar array of claim 1, wherein the photovoltaic cells comprise thin film photovoltaic cells.

4. The deployable solar array of claim 1, wherein the photovoltaic cells are grouped into panels.

5. The deployable solar array of claim 1, wherein the longeron comprises a shape-memory material.

6. The deployable solar array of claim 1, wherein the longeron is flattened when stowed as a roll.

7. The deployable solar array of claim 1, wherein in the stowed configuration the longeron is exposed on the outside of the roll.

8. The deployable solar array of claim 1 further comprising one or more additional longerons with a slit along the longitudinal length of the longerons.

9. A deployable array comprising:
    a longeron comprising a tubular member that includes a slit along the longitudinal length of the longeron;
    a planar solar array coupled with the longeron;
    wherein the longeron and the planar array are stowed as a roll comprising the longeron and the planar array, wherein the roll is configured to deploy by being rolled along a longitudinal length of the longeron.

10. The deployable array according to claim 9, wherein the planar solar array comprises a plurality of photovoltaic cells coupled with the array.

11. The deployable array according to claim 9, wherein the planar solar array is substantially planar when deployed.

12. The deployable array according to claim 9, wherein the longeron comprises two longerons that are substantially parallel when deployed.

13. The deployable array according to claim 9, further comprising a satellite body coupled with the longeron.

14. The deployable array according to claim 9, wherein in the stowed configuration the deployable array is unrolled above the plane of the deployed array.

15. The deployable array according to claim 9, further comprising one or more additional longerons with a slit along the longitudinal length of the longerons, and each additional longeron being coupled with the planar array.

16. A deployable array comprising:
   a longeron comprising a tubular member that includes a slit along the longitudinal length of the longeron; and
   an array coupled with the longeron, wherein the array comprises thin film photovoltaic cells;
   wherein the deployable array is configured to include a deployed configuration and a stowed configuration, wherein in the stowed configuration the deployable array is in a roll that is back-rolled along the longitudinal length of the longeron, wherein in the deployed configuration the longeron is extended along the longitudinal length of the longeron, and wherein in the stowed configuration the deployable array is unrolled above the plane of the deployed array.

17. The deployable array according to claim 16, wherein in the stowed configuration the longeron is exposed on the outside of the roll.

18. The deployable array according to claim 16, wherein the array comprises a planar array.

19. The deployable array according to claim 16, wherein the array comprises a plurality of photovoltaic cells.

* * * * *